(12) United States Patent
Kim

(10) Patent No.: US 11,950,549 B2
(45) Date of Patent: Apr. 9, 2024

(54) PLANT CULTIVATION FOR INCREASING PHYTOCHEMICAL CONTENT

(71) Applicant: SEOUL VIOSYS CO., LTD., Gyeonggi-do (KR)

(72) Inventor: Se Ryung Kim, Gyeonggi-do (KR)

(73) Assignee: Seoul Viosys Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/892,201

(22) Filed: Aug. 22, 2022

(65) Prior Publication Data

US 2023/0043019 A1 Feb. 9, 2023

Related U.S. Application Data

(63) Continuation of application No. 17/208,989, filed on Mar. 22, 2021, now Pat. No. 11,432,474.

(60) Provisional application No. 62/993,142, filed on Mar. 23, 2020.

(51) Int. Cl.
*A01G 7/04* (2006.01)
*A01G 9/24* (2006.01)

(52) U.S. Cl.
CPC ............ *A01G 7/045* (2013.01); *A01G 9/249* (2019.05)

(58) Field of Classification Search
CPC ................................ A01G 7/045; A01G 9/249
USPC .............................................................. 47/14
See application file for complete search history.

(56) References Cited

U.S. PATENT DOCUMENTS

| | | |
|---|---|---|
| 11,432,474 B2 | 9/2022 | Kim |
| 2008/0120736 A1 | 5/2008 | Hurst |
| 2011/0209404 A1 | 9/2011 | Scott |
| 2020/0068809 A1 | 3/2020 | Ko et al. |
| 2021/0092906 A1 | 4/2021 | Oh et al. |

FOREIGN PATENT DOCUMENTS

| | | |
|---|---|---|
| JP | 2007068512 A | 3/2007 |
| JP | 2011097900 A | 5/2011 |
| KR | 1020190122456 A | 10/2019 |

OTHER PUBLICATIONS

Craver et al. J. Amer. Soc. Hort. Sci. 142(1):3-12 (Year: 2017).*
International Search Report for International Application No. PCT/KR2021/003597, dated Jul. 15, 2021, 2 pages.
Shiga et al. Plant Biotechnology 26; 255-259 (Year: 2009).
Robinson, Keith, Office Action for U.S. Appl. No. 17/208,989, dated Nov. 4, 2021, 11 pages.
Robinson, Keith, Notice of Allowance for U.S. Appl. No. 17/208,989, dated Nov. 4, 2021, 11 pages.

* cited by examiner

*Primary Examiner* — Keith O. Robinson
(74) *Attorney, Agent, or Firm* — LaBatt, LLC

(57) ABSTRACT

Plant cultivation for increasing the phytochemical content of a Labiatae plant is provided. The plant cultivation includes cultivating the Labiatae plant in a visible light environment having a dark period and a light period during which the Labiatae plant is exposed to visible light in an alternate manner, and performing treatment with UVB radiation during the light period for at least one day before harvesting. A cumulative dose of the UVB radiation may range from 0.54 $J/m^2$ to 4.32 $kJ/m^2$.

11 Claims, 13 Drawing Sheets

EXPERIMENT 3

EXPERIMENT 3

EXPERIMENT 3

EXPERIMENT 4

EXPERIMENT 4

EXPERIMENT 4

EXPERIMENT 5

PLANT CULTIVATION FOR INCREASING PHYTOCHEMICAL CONTENT

CROSS-REFERENCE OF RELATED APPLICATION AND PRIORITY

The present application is a continuation of U.S. patent application Ser. No. 17/208,989, filed Mar. 22, 2021, which is a Non-provisional Application which claims priority to the benefit of U.S. Provisional Application No. 62/993,142 filed Mar. 23, 2020, the disclosure of each of which is incorporated by reference in its entirety.

FIELD

Embodiments of the present disclosure relate to a plant cultivation method for increasing the phytochemical content of a plant.

BACKGROUND

Plants produce organic matter from carbon dioxide and water using light energy through photosynthesis. Plants use chemical energy of organic matter obtained through photosynthesis as nutrients for growth.

Plants contain phytochemicals that have beneficial effects on a subject in need thereof. Phytochemical levels of plants vary depending on growth environments. For example, plants produce antioxidants to protect themselves against damage from oxidative stress.

Labiatae plants, such as *perilla*, sweet basil, lemon balm, peppermint, basil, mint, and rosemary, are often used as spices due to strong scents thereof.

Labiatae plants are known to be rich in rosmarinic acid, which is a phenolic phytochemical having anti-inflammatory, anti-allergic, and anti-cancer efficacy.

SUMMARY

Embodiments of the present disclosure provide a cultivation apparatus for a Labiatae plant, which can promote production of phytochemicals in the plant while increasing yield of the plant, and a cultivation method using the same.

In accordance with one embodiment of the present disclosure, a plant cultivation method for increasing the content of a phytochemical includes: cultivating a Labiatae plant in a visible light environment in which a dark period and a light period for which the Labiatae plant is exposed to visible light are alternated; and performing UV treatment using UVB radiation for at least one day before harvesting. Here, the UV treatment is performed for the light period. In addition, a cumulative dose of the UVB radiation may range from 0.54 $J/m^2$ to 4.32 $kJ/m^2$.

The plant cultivation method according to the embodiment can promote production of phytochemicals in Labiatae plants without deterioration in quality of the plants. Accordingly, the plant cultivation method according to the embodiment can improve the yield of Labiatae plants while increasing the phytochemical content of the plants.

DETAILED DESCRIPTION

Figure 1:
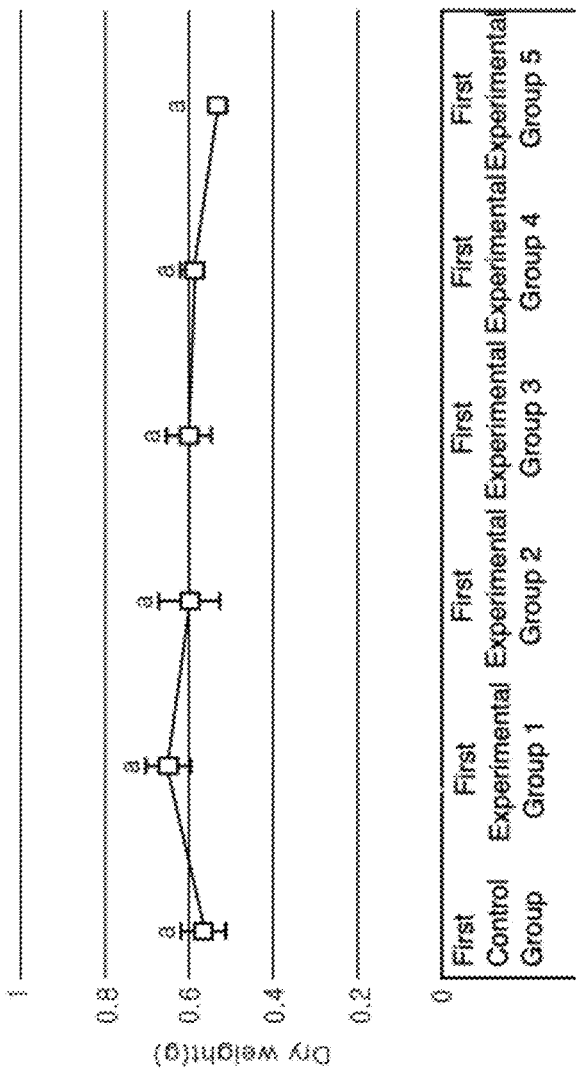
FIG. 1 is a graph showing changes in dry weight of *perilla* depending on UV treatment conditions in Experiment 1.

Hereinafter, embodiments of the present disclosure will be described with reference to the accompanying drawings. It should be understood that the embodiments are provided for complete disclosure and thorough understanding of the present disclosure by those skilled in the art. Therefore, the present disclosure is not limited to the following embodiments and may be embodied in different ways. In addition, the drawings may be exaggerated in width, length, and thickness of components for descriptive convenience and clarity only. Like components will be denoted by like reference numerals throughout the specification.

Labiatae plants to which embodiments of the present disclosure are applied include *perilla* and sweet basil.

In some embodiments, *perilla* or sweet basil is cultivated under conditions of 22° C. and 70% RH after sowing until harvest time.

In addition, a light source for cultivation of *perilla* or sweet basil is an LED (red:white:blue=11:4:3), and a diel photoperiod is set to 16 hours of light and 8 hours of dark. The LED is used after growing seeds of *perilla* or sweet basil under dark conditions for a predetermined period of time after sowing.

Further, *perilla* or sweet is cultivated using only purified water before transplantation into a deep-flow technique (DFT) hydroponics system and is cultivated using a nutrient solution after the transplantation. Here, the nutrient solution is prepared by diluting Hoagland stock solution and is maintained at a pH of 5.5 to 6.5 and at an EC of 1.2 mS/cm to 1.3 mS/cm.

In the embodiments, experiments with Control and Experimental groups were conducted so as to determine changes in growth and phytochemical content of a Labiatae plant depending on UV treatment conditions.

Here, the Experimental group refers to a group of plant samples subjected to UV treatment. Here, the plant samples refer to *perilla* or sweet basil samples. The Control group refers to a group of plant samples not subjected to UV treatment and serves as a reference for determining changes in growth and phytochemical content of the plant depending on UV treatment conditions.

For example, changes in growth of the plant may be determined based on the dry weights of the Control group and the Experimental group. In addition, changes in phytochemical content of the plant may be determined based on the flavonol content or rosmarinic acid content of the Control group and the Experimental group.

The flavonol content of the samples of the Control group and the Experimental group was measured using a leaf-clip sensor (Dualex) immediately before harvesting. Here, the flavonol content of the samples of the Experimental group were measured after UV treatment. After measurement of the flavonol content, the samples were harvested.

The harvested samples were cooled using liquid nitrogen to stop biological activity thereof, followed by drying at −80° C. or less for 3 days using a freeze dryer, and then the weight of the dried samples was measured.

After measurement of the dry weight of the samples, the dried samples were pulverized. Then, 10 g of the pulverized samples was placed in a weighing flask, followed by addition of 10 mL of methanol. Then, the resultant was subjected to ultrasonic extraction for 1 hour using an ultrasonic disperser, thereby obtaining an analyte. Then, the obtained analyte was centrifuged, followed by filtering a supernatant through a 0.45 μm syringe filter, thereby preparing an analyte solution.

In addition, 10 mg of standard rosmarinic acid was weighed and dissolved in 10 mL of methanol, thereby preparing a stock solution. Then, the stock solution was diluted, thereby preparing an analyte solution of the standard rosmarinic acid.

The rosmarinic acid content of the samples of the Control group and the Experimental group was analyzed using an analysis instrument (HPLC 1100 series). Here, analysis conditions were as shown in Table 1.

TABLE 1

| Analysis conditions | |
| --- | --- |
| Column | C18 column 4.6 mm × 250 mm, 5 μm |
| Flow Rate | 1.0 mL/min |
| Wavelength | 230 nm |
| Mobile Phase | A = 0.1% phosphoric acid in DW |
| | B = Acetonitrile |

TABLE 1-continued

| Analysis conditions | | | |
| --- | --- | --- | --- |
| Time table | Time (m) | A (%) | B (%) |
| | 0 | 100 | 0 |
| | 45 | 40 | 60 |
| | 45.5 | 10 | 90 |
| | 50 | 10 | 90 |
| Post time | 15 min | | |

Experiments 1 and 2 are aimed at determining changes in growth and phytochemical content of *perilla* depending on UV treatment conditions. *Perilla* samples used in the experiments were all cultivated in the following manner.

Seeds of *perilla* were grown under dark conditions for 2 days after sowing. Then, the seeds were cultivated at 70 PPFD (μmol/m$^2$/s) for 7 days to be germinated.

Then, the germinated seeds were transplanted into a hydroponics system and were cultivated at 150 PPFD for 24 days, followed by harvesting grown *perilla* leaves. Thus, the *perilla* samples were cultivated for a total period of 33 days.

Experiment 1

Experiment 1 is aimed at determining changes in growth and phytochemical content of *perilla* depending on the wavelength of UV light used.

Figure 2:
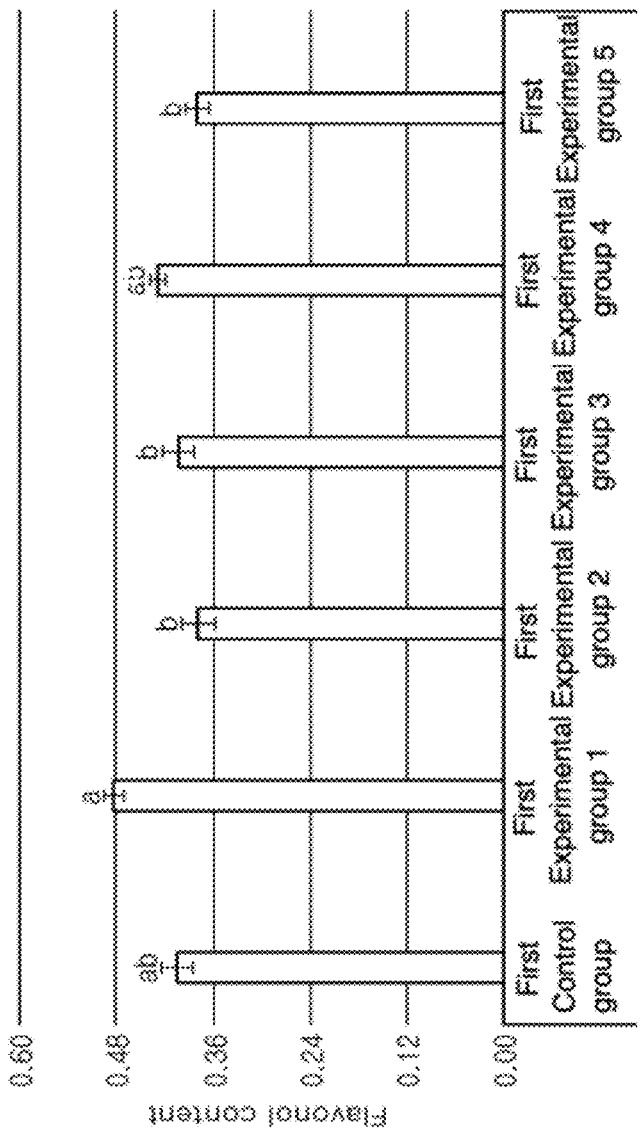
FIG. 2 is a graph showing changes in flavonol content of *perilla* depending on UV treatment conditions in Experiment 1.
Figure 3:
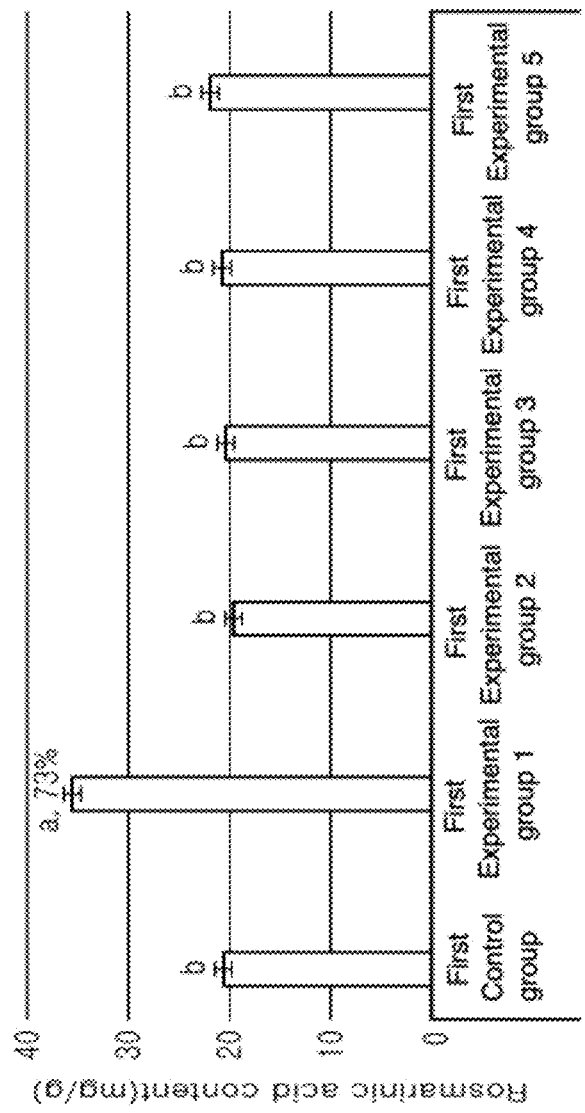
FIG. 3 is a graph showing changes in rosmarinic acid content of *perilla* depending on UV treatment conditions in Experiment 1.

FIG. 1 is a graph comparing the growth of *perilla* between groups, and FIGS. 2 and 3 are graphs comparing the phytochemical content of *perilla* between groups.

More specifically, FIG. 1 is a graph showing changes in dry weight of *perilla* depending on UV treatment conditions in Experiment 1. FIG. 2 is a graph showing changes in flavonol content of *perilla* depending on UV treatment conditions in Experiment 1. FIG. 3 is a graph showing changes in rosmarinic acid content of *perilla* depending on UV treatment conditions in Experiment 1.

A First Control group was a group of *perilla* samples not subjected to UV treatment. On the other hands, First Experimental groups 1 to 5 are groups of *perilla* samples treated with UVB1 or UVB2 for the light period the day before harvesting. Here, UVB1 is UV light in the wavelength range of 280 nm to 290 nm. In addition, UVB2 is UV light in the wavelength range of 310 nm to 320 nm.

First Experimental group 1 was a group of *perilla* samples treated with UVB1 at an intensity of 413 kJ/mol to 427 kJ/mol. Here, a cumulative dose of UVB1 radiation to which the *perilla* samples of Experimental Group 1 were exposed was 0.54 kJ/m$^2$.

First Experimental group 2 was a group of *perilla* samples treated with UVB2 at an intensity of 374 kJ/mol to 386 kJ/mol. Here, a cumulative dose of UVB2 radiation to which the *perilla* samples of Experimental Group 2 were exposed was 0.54 kJ/m$^2$.

First Experimental group 3 is a group of *perilla* samples treated with UVB2 at an intensity of 374 kJ/mol to 386 kJ/mol. Here, a cumulative dose of UVB2 radiation to which the *perilla* samples of Experimental Group 2 were exposed was 1.08 kJ/m$^2$.

First Experimental group 4 is a group of *perilla* samples treated with UVB2 at an intensity of 374 kJ/mol to 386 kJ/mol. Here, a cumulative dose of UVB2 radiation to which the *perilla* samples of Experimental Group 2 were exposed was 2.16 kJ/m$^2$.

First Experimental group 5 is a group of *perilla* samples treated with UVB2 at an intensity of 374 kJ/mol to 386 kJ/mol. Here, a cumulative dose of UVB2 radiation to which the *perilla* samples of Experimental Group 2 were exposed was 4.32 kJ/m$^2$.

Referring to FIG. 1, the dry weight was similar in the First Control group and First Experimental Groups 1 to 5 and there was no significant difference in dry weight between the First Control group and First Experimental Groups 1 to 5. Accordingly, it can be seen that UV treatment immediately before harvesting does not stunt the growth of *perilla*.

Referring to FIG. 2, the average flavonol content was 0.41±0.02 in the First Control group, 0.48±0.01 in Experimental Group 1, 0.38±0.03 in First Experimental Group 2, 0.40±0.02 in First Experimental Group 3, 0.43±0.02 in First Experimental Group 4, and 0.38±0.01 in First Experimental Group 5.

Accordingly, there was a slight but insignificant difference in flavonol content between the Control group and First Experimental Groups 1 to 5. Thus, it can be seen that treatment with UVB radiation has no significant effect on the flavonol content of *perilla*.

Referring to FIG. 3, the average rosmarinic acid content was 20.42±0.86 mg/g in the First Control group, 35.39±1.92 mg/g in First Experimental Group 1, 19.42±0.53 mg/g in First Experimental Group 2, 20.32±0.48 mg/g in First Experimental Group 3, 20.62±0.81 mg/g in First Experimental Group 4, and 21.80±1.04 mg/g in First Experimental Group 5.

That is, the rosmarinic acid content of the First Experimental Group 1 increased by about 73%, as compared with that of the First Control group. However, there was little change in rosmarinic acid content between the First Control group and First Experimental Groups 2 to 5. Accordingly, it can be seen that treatment with UVB1 radiation increases the rosmarinic acid content of *perilla*.

In addition, it can be seen that treatment with UVB2 radiation causes no significant change in rosmarinic acid content of *perilla*. Further, comparison between First Experimental Groups 2 to 5 shows that treatment with UVB2 radiation has no significant effect on the rosmarinic acid content of *perilla*, regardless of increase in energy intensity thereof.

Therefore, First Experiment 1 shows that treatment with UVB1 radiation at an intensity of 413 kJ/mol to 427 kJ/mol is effective in increasing the content of phytochemicals, such as rosmarinic acid, without stunting the growth of *perilla*.

Experiment 2

Experiment 2 is aimed at determining changes in growth and phytochemical content of *perilla* depending on whether UV treatment is performed for the light period or the dark period.

Experiment 2 was conducted using UVB1, which was confirmed to be effective in increasing the phytochemical content in Experiment 1.

Figure 4:
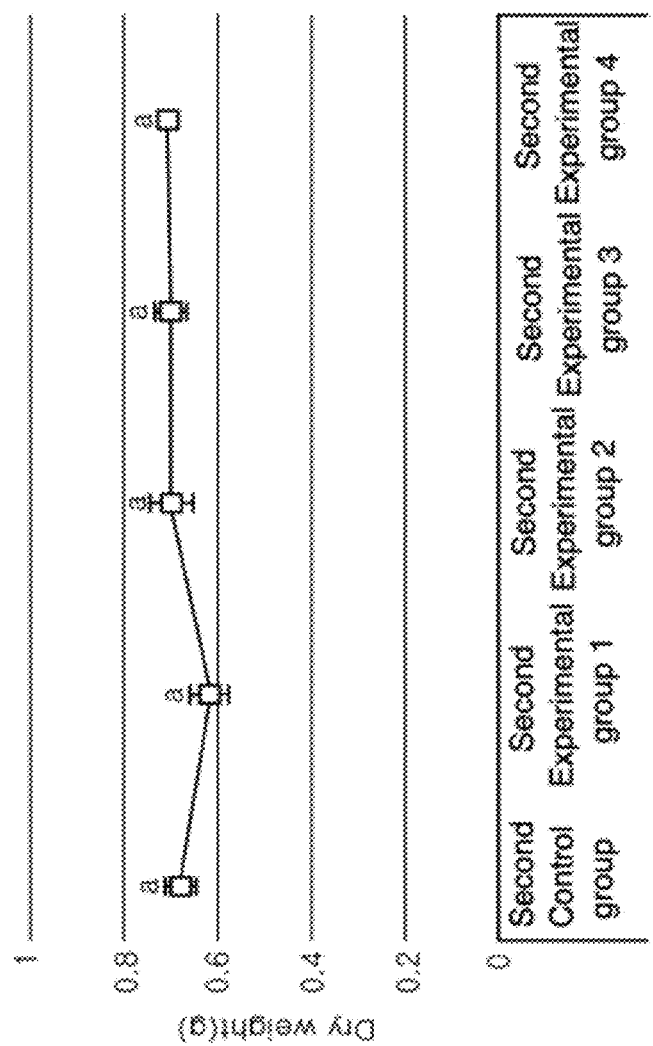
FIG. 4 is a graph showing changes in dry weight of *perilla* depending on UV treatment conditions in Experiment 2.
Figure 5:
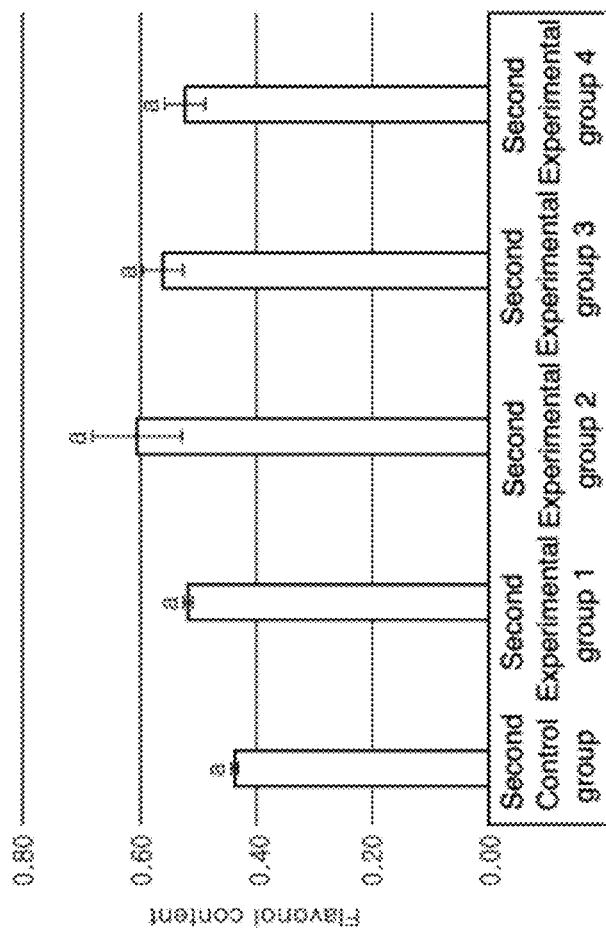
FIG. 5 is a graph showing changes in flavonol content of *perilla* depending on UV treatment conditions in Experiment 2.
Figure 6:
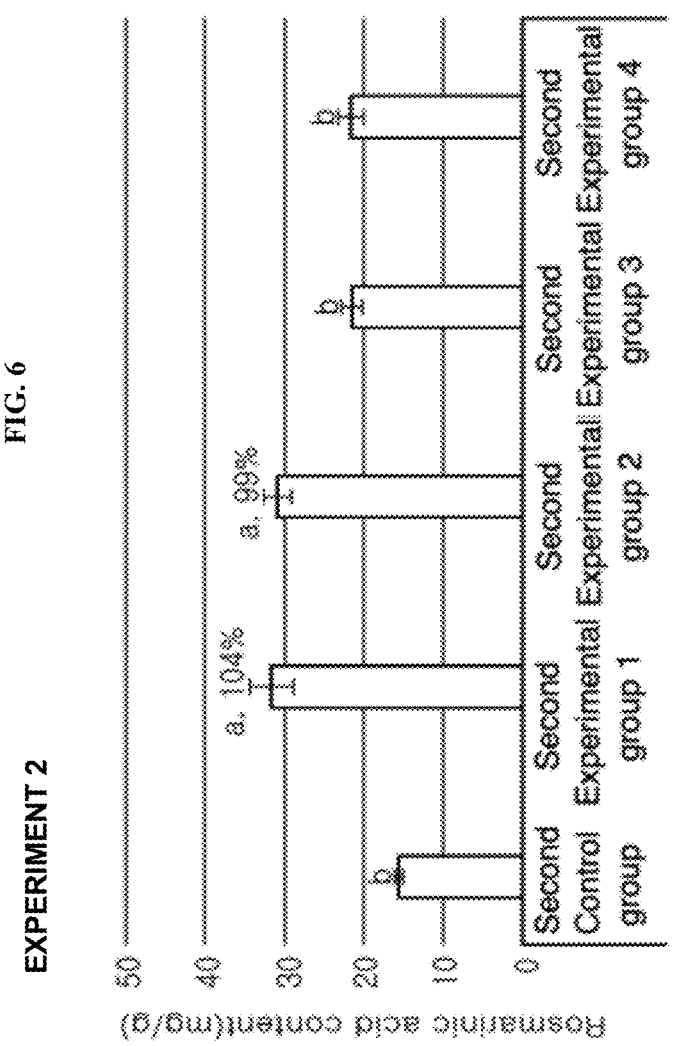
FIG. 6 is a graph showing changes in rosmarinic acid content of *perilla* depending on UV treatment conditions in Experiment 2.

FIG. 4 is a graph showing changes in dry weight of *perilla* depending on UV treatment conditions in Experiment 2. FIG. 5 is a graph showing changes in flavonol content of *perilla* depending on UV treatment conditions in Experiment 2. FIG. 6 is a graph showing changes in rosmarinic acid content of *perilla* depending on UV treatment conditions in Experiment 2.

A Second Control group was a group of *perilla* samples not subjected to UV treatment. On the other hand, Second Experimental groups 1 to 4 are groups of *perilla* samples treated with UVB1 for the light period or the dark period the day before harvesting.

Second Experimental groups 1 and group 2 are groups of *perilla* samples treated with UVB1 for the light period. Here, a cumulative dose of UVB1 radiation to which Second Experimental Group 1 was exposed was 0.54 kJ/m$^2$, and a cumulative dose of UVB1 radiation to which Second Experimental Group 2 was exposed was 1.08 kJ/m$^2$.

Second Experimental group 3 and Experimental Group 4 were groups of *perilla* samples treated with UVB1 during the dark period. Here, a cumulative dose of UVB1 radiation to which Second Experimental Group 3 was exposed was 0.54 kJ/m$^2$, and a cumulative dose of UVB1 radiation to which Second Experimental Group 4 was exposed was 1.08 kJ/m$^2$.

Referring to FIG. 4, there was no significant difference in dry weight between the Second Control group and Second Experimental Groups 1 to 4.

Referring to FIG. 5, the average flavonol content was 0.44±0.01 in the Second Control group, 0.52±0.01 in Second Experimental Group 1, 0.61±0.08 in Second Experimental Group 2, 0.56±0.03 in Second Experimental Group 3, and 0.52±0.04 in Second Experimental Group 4.

The flavonol content slightly but insignificantly increased in Second Experimental Groups 1 to 4, as compared with the Second Control group.

Referring to FIG. 6, the average rosmarinic acid content was 15.50±0.68 mg/g in the Second Control group, 31.68±2.53 mg/g in Second Experimental group 1, 30.83±1.83 mg/g in Second Experimental group 2, 21.62±1.21 mg/g in Second Experimental group 3, and 21.73±1.45 mg/g in Second Experimental group 4.

The rosmarinic acid content of Second Experimental Group 1 increased by 104%, as compared with that of the Second Control group, and the rosmarinic acid content of Second Experimental group 2 increased by 99%, as compared with that of the Second Control group. The rosmarinic acid content of Second Experimental groups 3 and 4 slightly, but insignificantly increased, as compared with that of the Second Control group.

Therefore, Experiment 2 shows that treatment with UVB1 for the light period is more effective in increasing the phytochemical content of *perilla* than treatment with UVB1 during the dark period.

Experiments 3 to 5 are aimed at determining changes in growth and phytochemical content of sweet basil depending on UV treatment conditions. Sweet basil samples used in the experiments were all grown in the following manner. Seeds of sweet basil were grown under dark conditions for 5 days after sowing. Thereafter, the seeds were cultivated at 70 PPFD (μmol/m$^2$/s) for 7 days to be germinated. Then, after being transplanted into a hydroponics system, the germinated seeds of sweet basil were cultivated at 150 PPFD for 7 days and then were cultivated at 268 PPFD for 26 or 29 days, followed by harvesting.

Experiment 3

Experiment 3 is aimed at determining changes in growth and phytochemical content of sweet basil depending UV treatment conditions.

Figure 7:
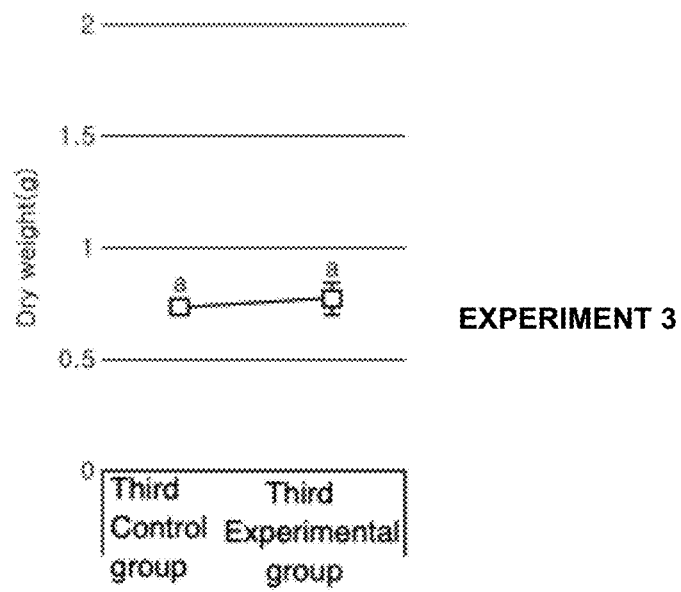
FIG. 7 is a graph showing changes in dry weight of sweet basil depending on UV treatment conditions in Experiment 3.
Figure 8:
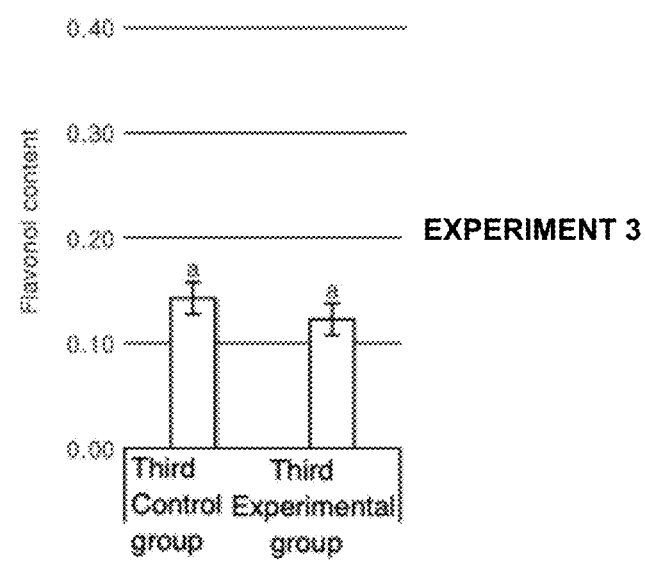
FIG. 8 is a graph showing changes in flavonol content of sweet basil depending on UV treatment conditions in Experiment 3.
Figure 9:
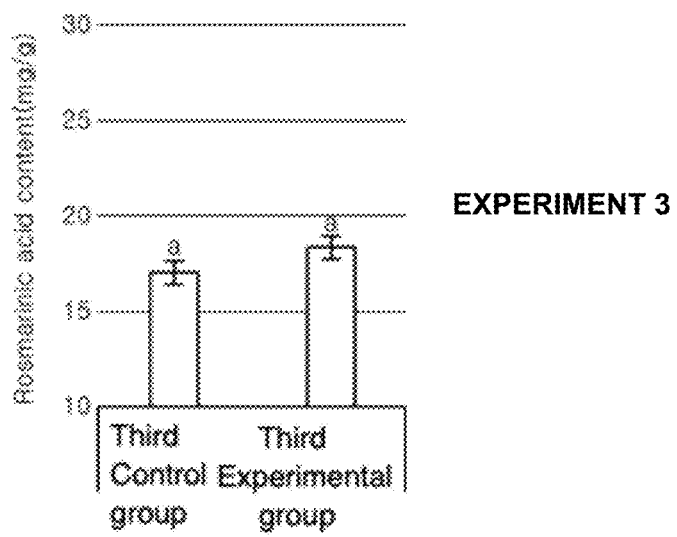
FIG. 9 is a graph showing changes in rosmarinic acid content of sweet basil depending on UV treatment conditions in Experiment 3.

FIG. 7 is a graph showing changes in dry weight of sweet basil depending on UV treatment conditions in Experiment 3. FIG. 8 is a graph showing changes in flavonol content of sweet basil depending on UV treatment conditions in Experiment 3. FIG. 9 is a graph showing changes in rosmarinic acid content of sweet basil depending on UV treatment conditions in Experiment 3.

The Third Control group is a group of sweet basil samples not subjected to UV treatment.

The Third Experimental group is a group of sweet basil samples treated with UVB1 once for the light period the day before harvesting. Here, a cumulative dose of UVB1 radiation to which Third Experimental group was exposed was 0.54 kJ/m².

In Experiment 3, the sweet basil samples were cultivated at 268 PPFD for 26 days, and were thus cultivated for a total period of 45 days.

Referring to FIG. 7, there is no significant difference in dry weight between the Third Control group and the Third Experimental group.

Referring to FIG. 8, the average flavonol content was 0.14±0.02 in the Third Control group and 0.12±0.02 in the Third Experimental group. The flavonol content slightly, but insignificantly decreased in the Third Experimental group, as compared with in the Third Control group.

Referring to FIG. 9, the average rosmarinic acid content was 16.78±0.68 mg/g in the Third Control group and 18.38±0.31 mg/g in the Third Experimental group. The rosmarinic acid content slightly but insignificantly increased in the Third Experimental group, as compared with that of the Third Control group.

Experiment 4

Experiment 4 was aimed at determining changes in growth and phytochemical content of sweet basil depending on UV treatment conditions.

Figure 10:
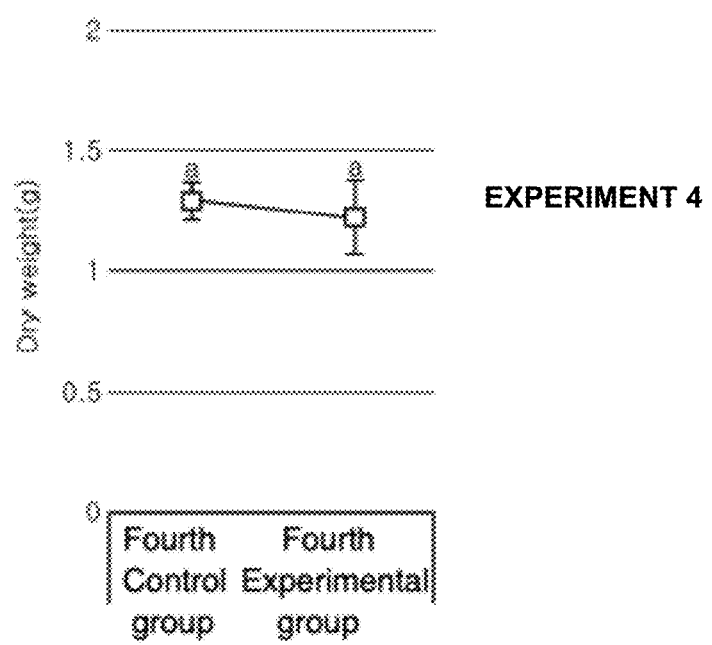
FIG. 10 is a graph showing changes in dry weight of sweet basil depending on UV treatment conditions in Experiment 4.
Figure 11:
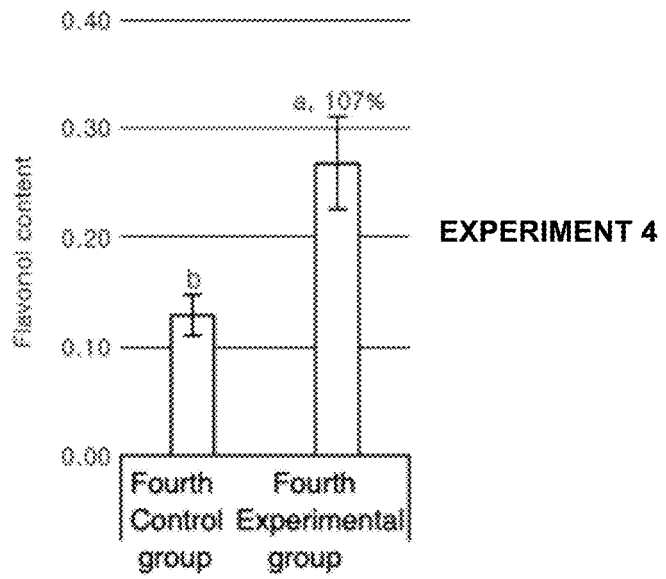
FIG. 11 is a graph showing changes in flavonol content of sweet basil depending on UV treatment conditions in Experiment 4.
Figure 12:
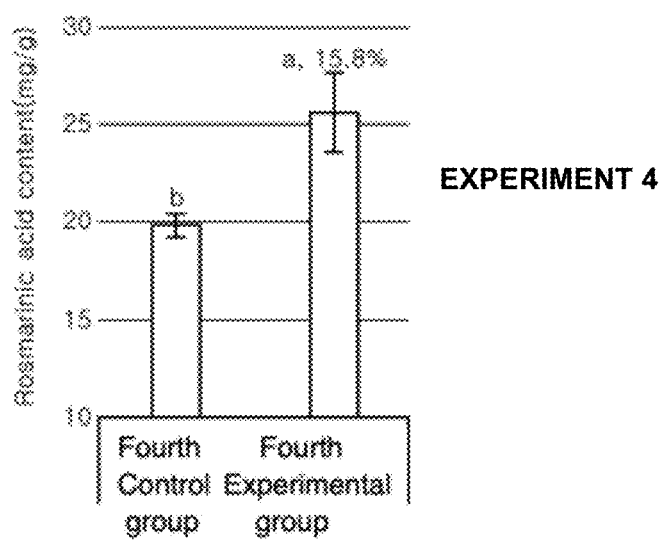
FIG. 12 is a graph showing changes in rosmarinic acid content of sweet basil depending on UV treatment conditions in Experiment 4.

FIG. 10 is a graph showing changes in dry weight of sweet basil depending on UV treatment conditions in Experiment 4. FIG. 11 is a graph showing changes in flavonol content of sweet basil depending on UV treatment conditions in Experiment 4. FIG. 12 is a graph showing changes in rosmarinic acid content of sweet basil depending on UV treatment conditions in Experiment 4.

The Fourth Control group is a group of sweet basil samples not subjected to UV treatment.

The Fourth Experimental group was a group of sweet basil samples treated with UVB1 for the light period for 4 days before harvesting. Here, UVB1 treatment was performed once a day. In addition, the Fourth Experimental group was exposed to a cumulative UVB1 dose of 0.54 kJ/m² in each treatment session and thus was exposed to a total cumulative UVB1 dose of 2.16 kJ/m².

In Experiment 4, the sweet basil samples were cultivated at 268 PPFD for 29 days and thus were cultivated for a total period of 48 days.

Referring to FIG. 10, there is no significant difference in dry weight between the Fourth Experimental group and the Fourth Control group.

Referring to FIG. 11, the average flavonol content was 0.13±0.02 in the Fourth Control group and 0.27±0.04 in the Fourth Experimental group. That is, in the Fourth Experimental group, the flavonol content increased by about 107%, as compared with in the Fourth Control group.

Referring to FIG. 12, the average rosmarinic acid content was 19.83±0.55 mg/g in the Fourth Control group and 25.66±2.08 mg/g in the Fourth Experimental group. That is, in the Fourth Experimental group, the rosmarinic acid content increased by about 16%, as compared with in the Fourth Control group.

Experiments 3 and 4 show that treatment with UVB1 for 4 days before harvesting can increase the phytochemical content without stunting the growth of sweet basil.

Experiment 5

Experiment 5 was aimed at determining changes in growth and phytochemical content of sweet basil depending on the cumulative UV dose.

Figure 13:
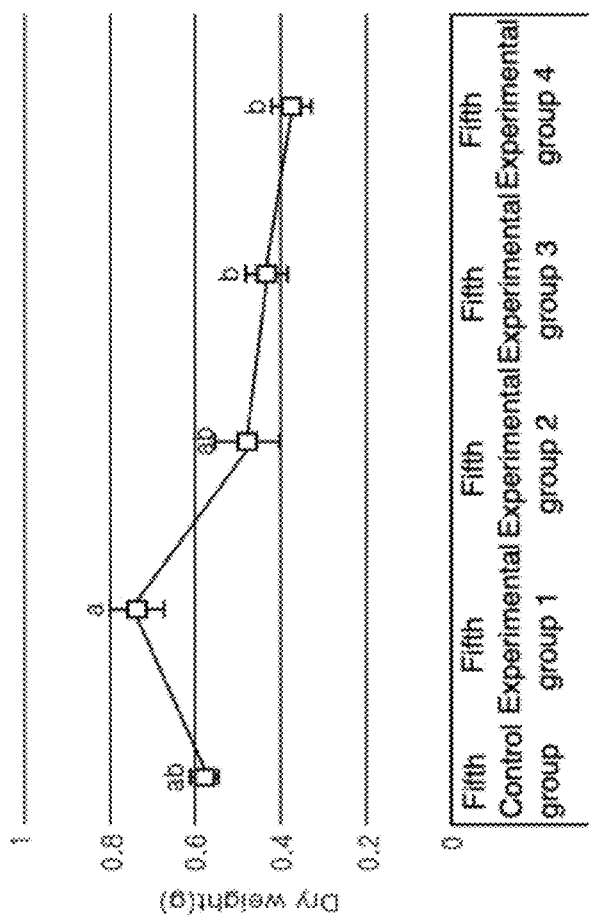
FIG. 13 is a graph showing changes in dry weight of sweet basil depending on UV treatment conditions in Experiment 5.
Figure 14:
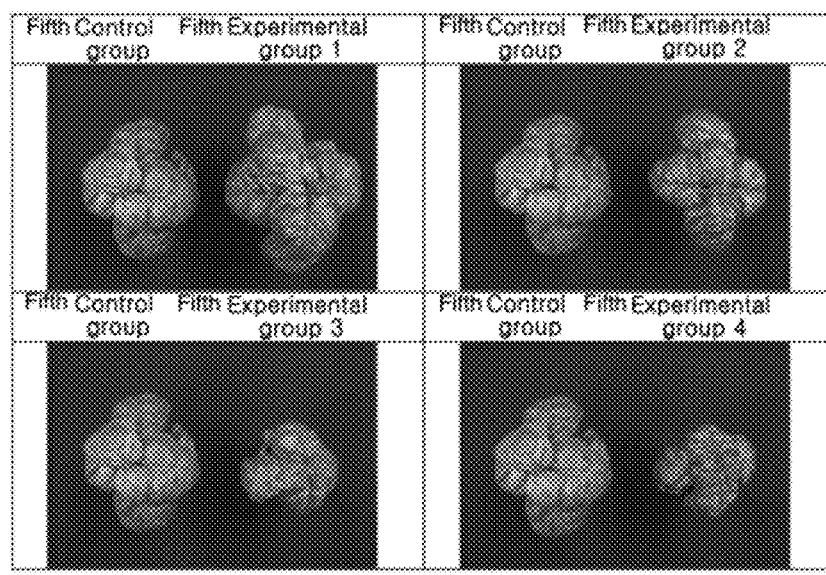
FIG. 14 is an image showing the growth status of sweet basil depending on UV treatment conditions in Experiment 5.
Figure 15:
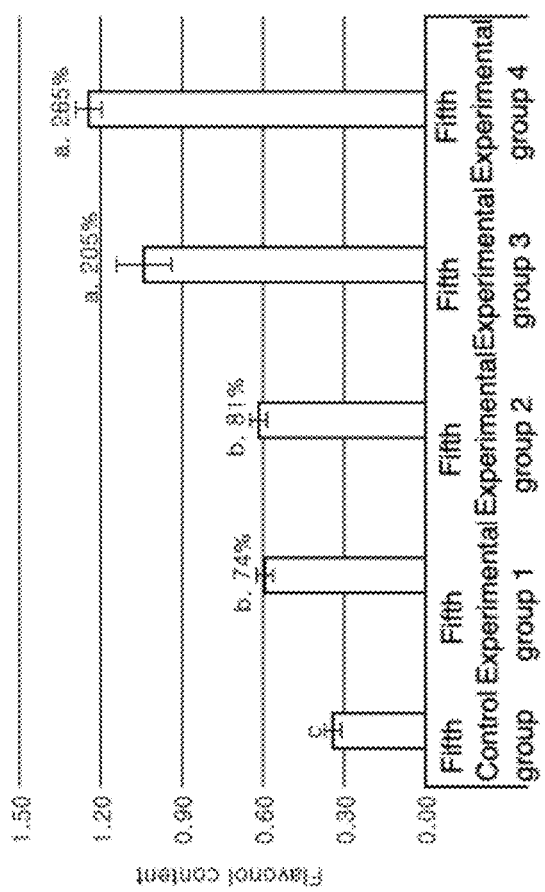
FIG. 15 is a graph showing changes in flavonol content of sweet basil depending on UV treatment conditions in Experiment 5.
Figure 16:
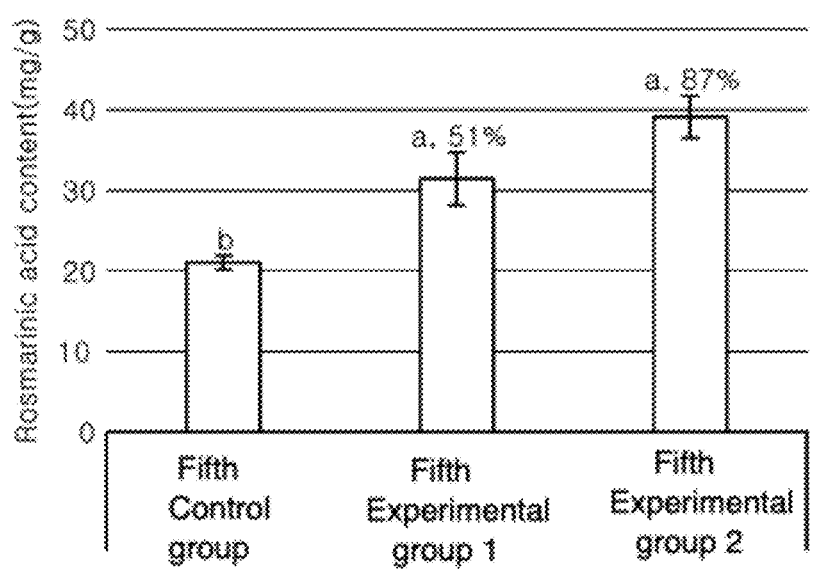
FIG. 16 is a graph showing changes in rosmarinic acid content of sweet basil depending on UV treatment conditions in Experiment 5.

FIG. 13 is a graph showing changes in dry weight of sweet basil depending on UV treatment conditions in Experiment 5. FIG. 14 is an image showing the growth status of sweet basil depending on UV treatment conditions in Experiment 5. FIG. 15 is a graph showing changes in flavonol content of sweet basil depending on UV treatment conditions in Experiment 5. FIG. 16 is a graph showing changes in rosmarinic acid content of sweet basil depending on UV treatment conditions in Experiment 5.

The Fifth Control group is a group of sweet basil samples not subjected to UV treatment.

The Fifth Experimental groups 1 to 4 are groups of sweet basil samples treated with UVB1 for the light period once a day, for 4 days before harvesting.

Sweet basil samples of the Fifth Experimental Group 1 were exposed to a UVB1 dose of 0.54 kJ/m² in each treatment session and thus were exposed to a total cumulative UVB1 dose of 2.16 kJ/m².

Sweet basil samples of the Fifth Experimental Group 2 were exposed to a UVB1 dose of 1.08 kJ/m² in each treatment session and thus were exposed to a total cumulative UVB1 dose of 4.32 kJ/m².

Sweet basil samples of the Fifth Experimental Group 3 were exposed to a UVB1 dose of 2.16 kJ/m² in each treatment session and thus were exposed to a total cumulative UVB1 dose of 8.64 kJ/m².

Sweet basil samples of the Fifth Experimental Group 4 were exposed to a UVB1 dose of 4.32 kJ/m² in each treatment session and thus to a total cumulative UVB1 dose of 17.28 kJ/m².

Referring to FIG. 13, the dry weight of the Fifth Experimental Group 1 increased, as compared with that of the Fifth Control group, and the dry weight of the Fifth Experimental Groups 2 to 4 decreased, as compared with that of the Fifth Control group. However, these differences in dry weight are not significant. That is, no significant changes in dry weight were observed between the Fifth Control group and the Fifth Experimental Groups 1 to 4.

However, referring to FIG. 14, it can be seen that the sweet basil samples of the Fifth Experimental Groups 2, 3, and 4 suffered damage, such as browning of leaves thereof. In particular, the sweet basil samples of the Fifth Experimental Groups 3 and 4 suffered browning over the entire surface of leaves thereof.

Accordingly, it can be seen that the dose of UVB1 radiation as applied to the Fifth Experimental Groups 3 and 4 can cause damage to sweet basil and thus reduction in commercial value thereof.

Referring to FIG. 15, the average flavonol content was 0.34±0.03 in the Control group, 0.59±0.03 in the Fifth Experimental group 1, 0.61±0.03 in the Fifth Experimental group 2, 1.04±0.1 in the Fifth Experimental Group 3, and 1.24±0.05 in the Fifth Experimental group 4. That is, the flavonol content increased by about 74% in the Fifth Experimental group 1, by about 81% in the Fifth Experimental group 2, by 205% in the Fifth Experimental group 3, and 265% in the Fifth Experimental group 4, as compared with in the Fifth Control group.

Referring to FIG. 16, the average rosmarinic acid content was 20.97±1.05 mg/g in the Control group, 31.74±3.07 mg/g in the Fifth Experimental group 1, and 39.25±2.62 mg/g in the Fifth Experimental group 2. That is, the rosmarinic acid content increased by about 51% in the Fifth Experimental group 1 and about 87% in the Fifth Experimental Group 2, as compared with in the Control group.

Experiment 5 shows that the phytochemical content of sweet basil increases with increasing cumulative dose of UVB1 radiation.

In addition, Experiment 5 shows that, upon treating sweet basil with UVB1 for the light period once a day for 4 days before harvesting, a cumulative dose of 2.16 kJ/m$^2$ or 4.32 kJ/m$^2$ is most effective in increasing the phytochemical content of sweet basil while minimizing UV-induced damage to sweet basil.

Based on the above, Experiments 1 to 5 show that treatment with UVB1 for 1 to 4 days before harvesting can increase the phytochemical content of Labiatae plants without sacrificing the growth of the plants.

In addition, Experiments 1 to 5 show that, when Labiatae plants are exposed to UVB1 radiation with a cumulative dose of 0.54 J/m$^2$ to 4.32 kJ/m$^2$, the Labiatae plants can have an increased phytochemical content without suffering poor growth.

Although some embodiments have been described herein, it should be understood that these embodiments are provided for illustration only and are not to be construed in any way as limiting the present disclosure. The scope of the present disclosure should be defined by the appended claims and equivalents thereto.

What is claimed is:

1. A plant cultivation system comprising:
a light emitting device including:
a first light emitter configured to emit light having a first wavelength range;
a second light emitter configured to emit light having a second wavelength range, wherein the second light emitter emits visible light; and
a third light emitter configured to emit light having a third wavelength range,
wherein the first, second, and third wavelength ranges are different,
wherein at least a portion of the first and second wavelength ranges overlap,
wherein the third wavelength range includes ultraviolet wavelengths,
wherein a mixed light emitted from the first, the second, and the third light emitters is directed onto a target plant for at least a portion of at least one day before the target plant is harvested.

2. The plant cultivation system of claim 1, wherein the mixed light includes a higher photon flux density of light emitted by the first light emitter than light emitted by the second light emitter.

3. The plant cultivation system of claim 2, wherein the first light emitter emits visible light.

4. The plant cultivation system of claim 3, a mixed light emitted from the first emitter and the second emitter has no more than 268 PPFD.

5. The plant cultivation system of claim 1, wherein the third light emitter emits no light for a plurality of days during growth of the plant.

6. The plant cultivation system of claim 1, wherein one of the first light emitter or the second light emitter emits white light and the other of the first light emitter or the second light emitter emits light having a visible wavelength range having a color.

7. The plant cultivation system of claim 1, wherein the third light emitter only emits light directed onto the target plant before harvesting.

8. The plant cultivation system of claim 7, wherein a cumulative dose of light emitted by the third light emitter ranges from 0.54 J/m$^2$ to 4.32 kJ/m$^2$.

9. The plant cultivation system of claim 7, wherein the third light emitter only emits light directed onto the target plant during 1 day before harvesting.

10. The plant cultivation system of claim 7, wherein the third light emitter only emits light directed onto the target plant for 4 days before harvesting.

11. The plant cultivation system of claim 1, wherein the light emitting device further includes a fourth light emitter configured to emit light having a fourth wavelength range, wherein the first wavelength range comprises white light, the second wavelength range comprises red light, and the fourth wavelength range comprises blue light.

* * * * *